(12) United States Patent
Clerc et al.

(10) Patent No.: US 10,300,613 B2
(45) Date of Patent: May 28, 2019

(54) SHOCK-ABSORBING DEVICE FOR A HUMANOID ROBOT

(71) Applicant: SOFTBANK ROBOTICS EUROPE, Paris (FR)

(72) Inventors: Vincent Clerc, Clamart (FR); Ludovic Tessier, Paris (FR); Fabien Mugnier, Paris (FR)

( * ) Notice: Subject to any disclaimer, the term of this patent is extended or adjusted under 35 U.S.C. 154(b) by 376 days.

(21) Appl. No.: 15/303,724

(22) PCT Filed: May 7, 2015

(86) PCT No.: PCT/EP2015/060046
§ 371 (c)(1),
(2) Date: Oct. 12, 2016

(87) PCT Pub. No.: WO2015/169894
PCT Pub. Date: Nov. 12, 2015

(65) Prior Publication Data
US 2017/0043487 A1 Feb. 16, 2017

(30) Foreign Application Priority Data
May 7, 2014 (FR) ..................................... 14 54161

(51) Int. Cl.
| | |
|---|---|
| *H05K 7/00* | (2006.01) |
| *H05K 5/00* | (2006.01) |
| *B25J 19/00* | (2006.01) |
| *F16F 1/377* | (2006.01) |
| *F16F 1/36* | (2006.01) |

(Continued)

(52) U.S. Cl.
CPC ........... *B25J 19/0091* (2013.01); *B25J 19/00* (2013.01); *F16F 1/3605* (2013.01); *F16F 1/377* (2013.01); *F21V 15/04* (2013.01); *H04R 1/025* (2013.01); *H04R 1/028* (2013.01); *F16F 2224/025* (2013.01); *F16F 2224/0225* (2013.01)

(58) Field of Classification Search
CPC ...................................................... G06F 19/00
See application file for complete search history.

(56) References Cited

U.S. PATENT DOCUMENTS

| | | | |
|---|---|---|---|
| 5,204,998 A | 4/1993 | Liu | |
| 8,498,743 B2* | 7/2013 | Kwak | B62D 57/032 318/568.11 |

(Continued)

FOREIGN PATENT DOCUMENTS

| | | |
|---|---|---|
| JP | 2003-145476 A | 5/2003 |
| JP | 2003-266363 A | 9/2003 |

*Primary Examiner* — Jerry Wu
(74) *Attorney, Agent, or Firm* — Baker & Hostetler LLP

(57) ABSTRACT

A shock-absorbing device for a humanoid robot, comprises a rigid structure linked to the humanoid robot, a deformable outer shell, and a shock-absorber; the shock-absorber consisting of a flexible cellular structure comprising a set of cells emerging in a main direction, and being secured to the rigid structure at a first end in the main direction, and linked to the deformable outer shell at a second end opposite the first in the main direction. Advantageously, the outer shell is also linked directly to the rigid structure by means of at least one absorbent fixing of silent block type. The invention relates also to a humanoid robot, and in particular the head of a humanoid robot, comprising such a shock-absorbing device.

12 Claims, 6 Drawing Sheets

(51) Int. Cl.
  *F21V 15/04* (2006.01)
  *H04R 1/02* (2006.01)

(56) References Cited

U.S. PATENT DOCUMENTS

2008/0185985 A1* 8/2008 Miyazaki ............ B25J 19/0091
                                                318/568.12
2011/0047678 A1  3/2011 Barth et al.

* cited by examiner

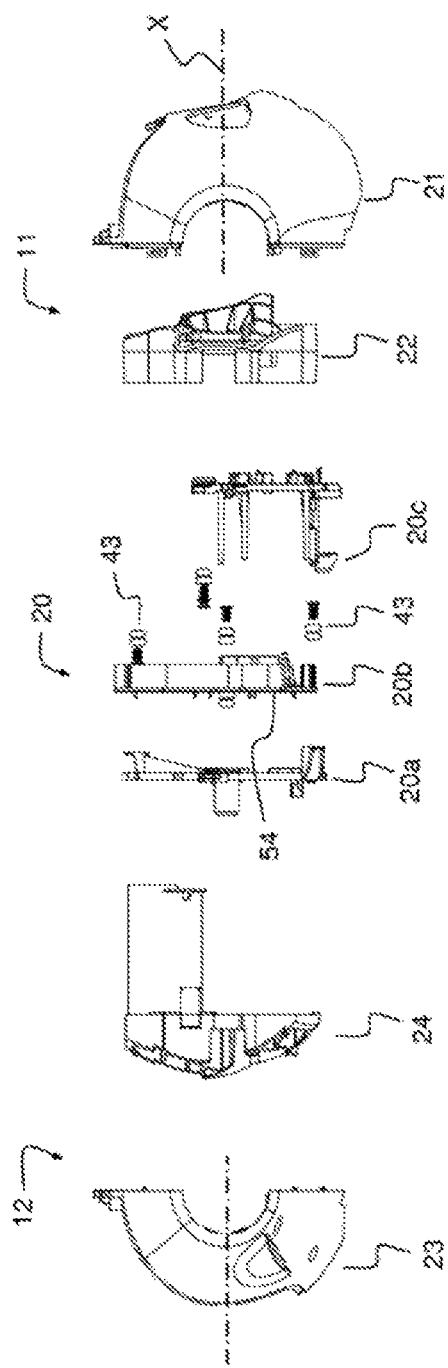

SHOCK-ABSORBING DEVICE FOR A HUMANOID ROBOT

CROSS-REFERENCE TO RELATED APPLICATIONS

This application is a National Stage of International patent application PCT/EP2015/060046, filed on May 7, 2015, which claims priority to foreign French patent application No. FR 1454161, filed on May 7, 2014, the disclosures of which are incorporated by reference in their entirety.

FIELD OF THE INVENTION

The present invention relates generally to a shock-absorbing device, in particular for securing and protecting electronics against shocks, for example linked to a fall of an apparatus containing such electronics (boards, components, etc.). The invention is of particular use for the protection of electronics embedded in humanoid robots against falls of said robot, the latter being an event that is particularly detrimental to the development of the uses of these robots.

BACKGROUND

A robot can be quantified as humanoid from the moment it possesses certain attributes of human appearance and functionalities: a head, a trunk, two arms, two hands, two legs or two feet. Humanoid robots are capable of walking, making gestures, with the limbs or with the head. The complexity of the gestures that they are capable of performing is constantly increasing. Despite these advances, the humanoid robots remain susceptible to falling. These falls can occur during robot debugging tests, but also in a subsequent phase of use of the robot, because of the inevitable obstacles or external interventions. To allow for a consumer application, the humanoid robots need to be able to withstand such falls repeatedly.

A particular difficulty stems from the relatively high position of the center of gravity of a humanoid robot. For example when a robot with a size of 70 cm falls, the deceleration undergone by the components of the head striking the ground can reach values of the order of 70 G. These undesirable but inevitable falls are likely in the current robots to damage the fragile components, such as the electronics or the sensors and actuators.

In a known approach, attempts have been made to circumvent this difficulty by lowering the center of gravity. A robot is for example known in which the lower part in skirt form houses the heaviest equipment items. This approach does however have the drawback of limiting the movements and functionalities of the upper part of the robot, in particular of the arms and of the head. To improve the resistance of the robot to falls, protection mechanisms have also been considered that are configured to be triggered when a fall of the robot is detected. This approach also presents limitations, in particular the untimely triggering of the protection mechanism during movements of the robot.

It therefore remains desirable to have solutions available to improve the mechanical strength of the humanoid robots and allow them to withstand repeated shocks against the latter. Obviously, such a solution needs to be able to fit into the functional and structural environment of the robot.

SUMMARY OF THE INVENTION

To this end, the subject of the invention is a shock-absorbing device for a mobile robot, the device comprising:

a rigid structure intended to be linked to the humanoid robot,
a deformable outer shell, and
a shock-absorber;
the shock-absorber consisting of a flexible cellular structure comprising a set of cells emerging in a main direction, and being secured to the rigid structure at a first end in the main direction, and linked to the deformable outer shell at a second end opposite the first in the main direction.

Advantageously, the outer shell is also linked directly to the rigid structure by means of at least one absorbent fixing of silent block type.

Advantageously, the shock-absorber comprises a seal plane substantially at right angles to the main direction; the cellular structure of the shock-absorber being configured in such a way that the cells close up with distance away from the seal plane in the main direction.

Advantageously, the shock-absorber consists of a material chosen from the list comprising natural rubber, 4-polyisoprene, synthetic polyisoprene, polybutadiene, styrene-butadiene copolymer, polyisobutylene, isobutylene-isoprene, chloroprene, neoprene, butadiene-acrylonitrile copolymer, ethylene-propylene copolymer, terpolymer, polyether block amide, elastomer thermoplastics, thermoplastic polyurethanes, thermoplastic olefins, polysulfides, elastin protein, silicone elastomers, fluoroelastomers, perfluoroelastomers, ethylene-vinyl acetate copolymer, polyacrylic elastomers, ethylene-acrylic copolymer, chlorosulfonated polyethylene, epichlorohydrin elastomers.

Advantageously, the device comprises an electronic module fixed to the rigid structure, and in which the shock-absorber comprises a chimney emerging at both ends in the main direction, making it possible to discharge heat emitted by the electronic module out of the robot.

Advantageously, the device comprises a fan fixed to the shock-absorber, and capable of generating an airflow in proximity to the electronic module and through the chimney.

Advantageously, the device comprises at least one light source linked to the rigid structure; the shock-absorber comprising an emergent duct configured to guide a light emitted by the light source out of the robot.

Advantageously, the device comprises at least one sound source linked to the rigid structure; the shock-absorber comprising an emergent duct configured to guide a sound wave emitted by the sound source out of the robot.

Advantageously, the device comprises at least one microphone fixed to an internal wall of the outer shell; the shock-absorber allowing phonic insulation.

The invention relates also to a humanoid robot comprising a shock-absorbing device having the features previously described.

The invention relates also to a head of a humanoid robot comprising a shock-absorbing device, and in which the rigid structure is linked to a trunk of the robot. Advantageously, the head comprises a first shock-absorbing device arranged in the front part of the head, and a second shock-absorbing device arranged in the rear part of the head; the two shock-absorbing devices being placed facing one another in the direction the main direction and on either side of a rigid structure common to both shock-absorbing devices.

The invention relates finally to a torso of a humanoid robot, comprising a first shock-absorbing device arranged in the front part of the humanoid robot, and a second shock-absorbing device arranged in the rear part of the robot; the two shock-absorbing devices being placed facing one another in the direction the main direction and on either side of a rigid structure common to both shock-absorbing devices.

BRIEF DESCRIPTION OF THE DRAWINGS

The invention will be better understood and other advantages will become apparent on reading the detailed description of an embodiment given by way of example in the following figures.

FIG. 3 represents an exploded view of a front shock-absorbing device and a rear shock-absorbing device linked to a column supporting the head of the humanoid robot.

For clarity, the same elements will bear the same references in the different figures.

DETAILED DESCRIPTION

Figure 1A:
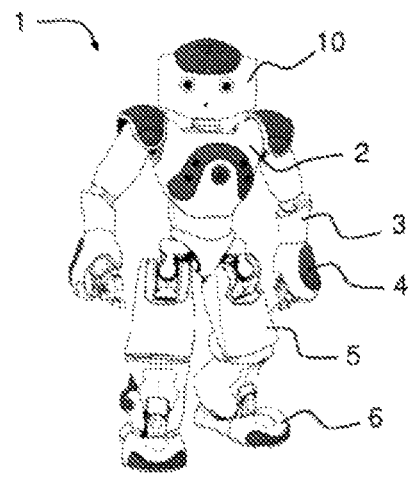
FIGS. 1a and 1b represent two examples of humanoid robots developed by the applicant.
Figure 1B:
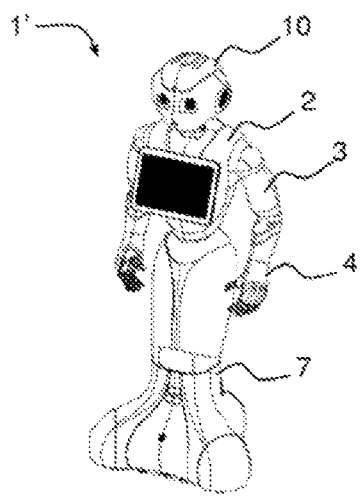

FIGS. 1a and 1b represent two examples of humanoid robots developed by the company ALDEBARAN ROBOTIC™. The humanoid robot 1 represented in FIG. 1a comprises a head 10, a trunk 2, two arms 3, two hands 4, two legs 5 and two feet 6. The humanoid robot 1' represented in FIG. 1b comprises a head 10, a trunk 2, two arms 3, two hands 4 and a skirt 7. The shock-absorbing device according to the invention is intended to protect such examples of humanoid robots from shocks, notably in cases of falls of the robot.

The shock-absorbing device according to the invention is particularly suited to the protection of fragile components that may be housed in the head of a humanoid robot. The embodiment that will be described hereinbelow relates to a humanoid robot head provided with two shock-absorbing devices. This embodiment effectively makes it possible to protect the head of a robot of significant size, for example of the order of 70 cm or more, from falls. It is nevertheless obvious that the present invention is not limited to this particular embodiment of a humanoid robot head provided with two shock-absorbing devices. On the contrary, it is understood that the invention relates generally to a shock-absorbing device which can be implemented, alone or in combination, to ensure the protection of the head of a humanoid robot, or of any other component of the humanoid robot. More generally, the device can be applied to a mobile robot comprising at least one articulated lower limb, in contact with the ground, leading to a risk of falling for the robot. In the present document, the designation "mobile robot" means a robot comprising at least one lower limb, articulated relative to a trunk of the robot about at least one degree of freedom in rotation.

Figure 2A:
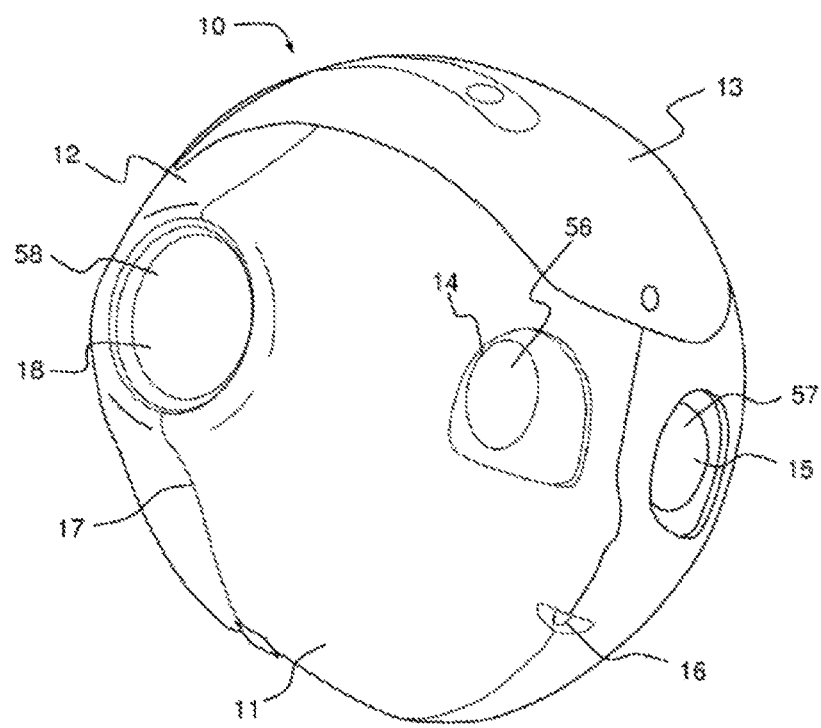
FIGS. 2a and 2b represent, respectively in perspective and in plan view, an example of a head of a humanoid robot comprising a shock-absorbing device according to the invention.
Figure 2B:
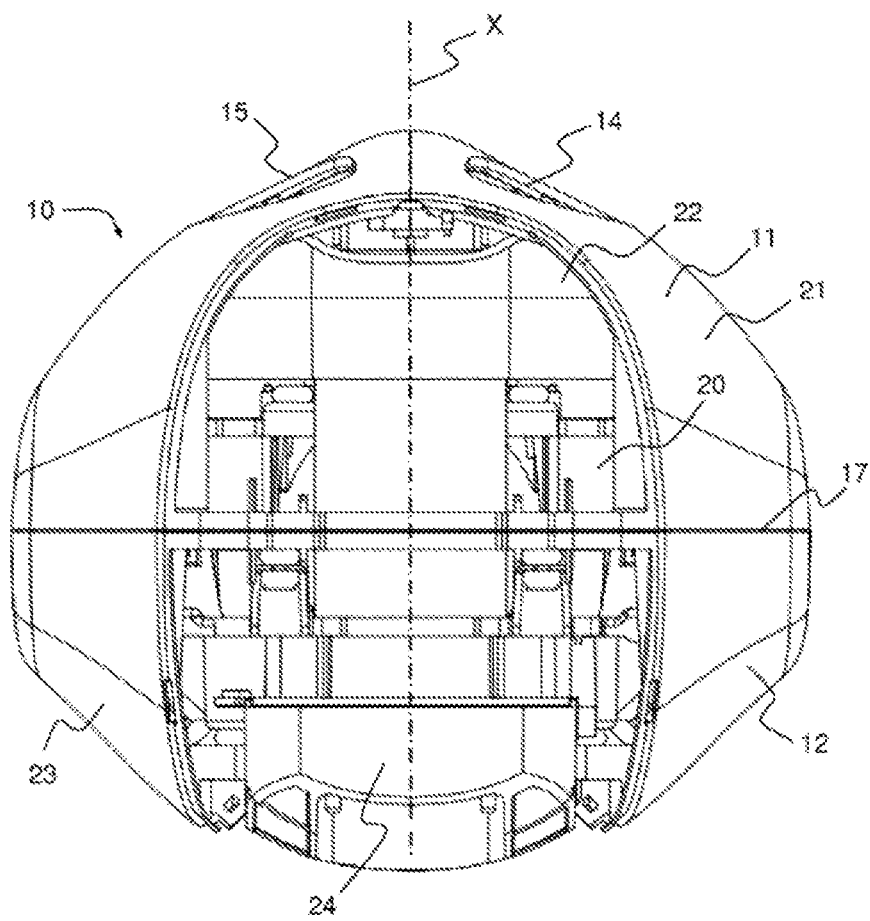

FIGS. 2a and 2b represent, respectively in perspective and in plan view, an example of a head of a humanoid robot comprising a shock-absorbing device according to the invention. In the example, the head 10 of the humanoid robot comprises a front shock-absorbing device 11, a rear shock-absorbing device 12 and a top cap 13. In the front shock-absorbing device 11, two lateral orifices 14 and 15 are formed, representing the eyes of the robot, and a central orifice 16 is formed representing the mouth of the robot. The front 11 and rear 12 shock-absorbing devices comprise two common lateral edges separating between the front part and the rear part of the robot. The right common edge, referenced 17, is represented in FIGS. 2a and 2b. In each shock-absorbing device, front 11 and rear 12, an opening of substantially semi-circular form is formed along each of the two lateral edges. The semi-circular opening of the front shock-absorbing device faces the semi-circular opening of the rear shock-absorbing device, thus forming, along the two common lateral edges, an opening 18 of substantially circular form representing an ear of the robot.

In FIG. 2b, the top cap 13 is not represented so that the components inside the head 10 of the robot are visible. The head 10 of the robot is linked to the trunk 2 of the robot by means of a rigid supporting column 20. The supporting column can consist of an assembly of several structural components, secured together, as described in FIG. 3. These components can be of rigid plastic material. Various items of equipment such as an electronic module, sensors and/or actuators can be fixed to the supporting column.

Each shock-absorbing device comprises a deformable outer shell and a shock-absorber. The front shock-absorbing device 11 comprises an outer shell 21 and a shock-absorber 22. The rear shock-absorbing device 12 comprises an outer shell 23 and a shock-absorber 24. These elements are described in detail hereinbelow.

FIG. 3 represents an exploded view of the front shock-absorbing device, the rear shock-absorbing device and the supporting column. The supporting column 20 consists of an assembly, here represented in an exploded view, of structural components 20a, 20b and 20c. After assembly, these components form the supporting column 20 linked to the trunk of the robot. In the example represented, the head of the robot is provided with two shock-absorbing devices placed facing one another, and on either side of the supporting column. Generally, the shock-absorbing device according to the invention comprises a deformable outer shell, a shock-absorber and a rigid structure. The aim of the shock-absorbing device is to absorb and dissipate the energy generated upon a shock, so as to protect fragile components that might be fixed to the rigid structure. In the example represented, the supporting column 20 constitutes the rigid structure common to the two shock-absorbing devices 11 and 12. Or, in other words, the rigid structure of each of the shock-absorbing devices is secured to the supporting column ensuring that the head of the robot is held in relation to its trunk.

Figure 4:
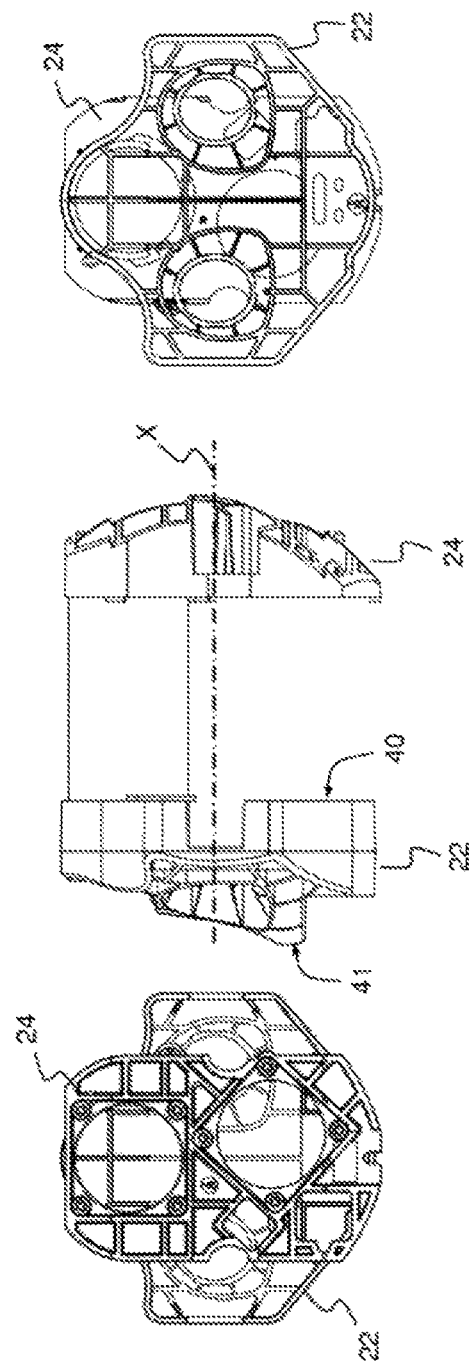
FIG. 4 represents, in three views, a shock-absorber of the front device and a shock-absorber of the rear device.

FIG. 4 represents, according to three views, the shock-absorbers 22 and 24 of the front 11 and rear 12 shock-absorbing devices. These two shock-absorbers, respectively the front shock-absorber 22 and the rear shock-absorber 24, are also represented according to three views, respectively in FIG. 5a and FIG. 5b.

In the example represented, the head of the humanoid robot comprises two shock-absorbing devices. The shock-absorbing device according to the invention is characterized in that it comprises a rigid structure 20 linked to the humanoid robot, a deformable outer shell and a shock-absorber consisting of a flexible cellular structure comprising a set of cells emerging in a main direction X. Furthermore, the shock-absorber is kept secured to the rigid structure at a first end in the main direction X, and is linked to the deformable outer shell at a second end opposite the first in the main direction X.

Various materials are considered for the production of the deformable outer shell. For example, a polystyrene can be implemented. Also envisaged is applying a coating or a surface treatment to the external wall of the deformable outer shell to improve the appearance thereof or to touch it up.

Figure 5A:
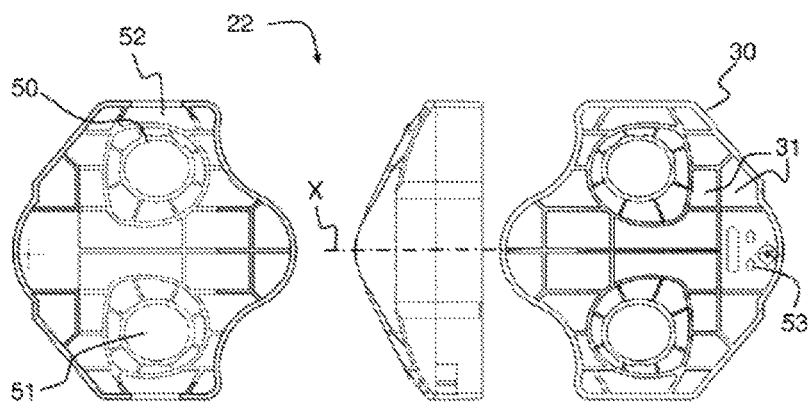
FIGS. 5a and 5b represent, in three views, the shock-absorber, respectively of the front device and of the rear device.

The shock-absorber consists of a flexible cellular structure comprising a set of cells emerging in the main direction X. In particular, the cellular structure of the front shock-absorber 22 is represented in FIG. 5a. The cellular structure comprises a plurality of walls 30 substantially parallel to the main direction. The walls define the set of cells 31 emerging in the main direction. Various materials capable of elastic deformation are envisaged for the production of the shock-absorber. Silicone, polyurethane or plant materials of sponge type are in particular envisaged. Preferentially, the shock-absorber consists of a material chosen from a list comprising natural rubber, 4-polyisoprene, synthetic polyisoprene, polybutadiene, styrene-butadiene copolymer, polyisobutylene, isobutylene-isoprene, chloroprene, neoprene, butadiene-acrylonitrile copolymer, ethylene-propylene copolymer, terpolymer, polyether block amide, elastomer thermoplastics, thermoplastic polyurethanes, thermoplastic olefins, polysulfides, elastin protein, silicone elastomers, fluoroelastomers, perfluoroelastomers, ethylene-vinyl acetate copolymer, polyacrylic elastomers, ethylene-acrylic copolymer, chlorosulfonated polyethylene, epichlorohydrin elastomers.

The shock-absorber is secured to the supporting column 20 at a first end in the main direction, and is linked to the deformable outer shell at a second end opposite the first in the main direction. FIG. 4 shows, for the front shock-absorbing device 11, the first end 40 secured to the supporting column and the second end 41 linked to the deformable outer shell 21. The first end can be secured to the supporting column by various fixing means, and in particular by bonding. Similarly, the second end can be linked to the deformable outer shell by various link means. It can notably be fixed to the outer shell by bonding.

In a particular implementation, the shock-absorber is held on the supporting column by a simple fitting, and ensures the holding of the outer shell also by a simple fitting. In this implementation, the outer shells of the front and rear shock-absorbing devices can be linked together at their common lateral edges 17. With the outer shells being simply fitted onto the shock-absorbers, themselves fitted onto the supporting column, the shells are floating in relation to the supporting column.

This configuration of a shock-absorbing device consisting of a deformable shell and a shock-absorber is particularly advantageous for protecting sensitive components fixed onto a rigid structure. For example, upon a fall of the robot, forward or backward, the head strikes the ground in a direction close to the main direction. The outer shell partially absorbs the shock by deforming, and transmits it partially to the shock-absorber. These shock is then absorbed by the shock-absorber in two stages. Initially, it causes a buckling deformation of the walls of the cellular structure. Upon this deformation of the walls at right angles to the main direction, a relatively weak stress is opposed. Then, in a second stage, if the buckling of the walls is not sufficient to absorb all of the shock, it is absorbed by elastic deformation of the elastic material forming the shock-absorber. More specifically, the various walls, after buckling, bear against one another and the shock-absorber then acts by elastic deformation substantially uniformly.

Thus, the sensitive components housed in the head of the robot and fixed onto the supporting column undergo a more gradual deceleration. The shockwave transmitted from the outer shell to the supporting column is substantially attenuated by the successive deformations of the shell and of the shock-absorber.

In an advantageous implementation of the present invention, the outer shell of a shock-absorbing device can also be linked directly to the supporting column by means of at least one absorbent fixing of silent block type. As represented in FIG. 3, fixing the outer shell 21 of the front shock-absorbing device 11 by means of a plurality of absorbent fixings 43 of silent block type is envisaged. The absorbent fixings 43 link the supporting column to the outer shell by means of several blocks of elastic material capable of absorbing shocks and vibrations between these two elements. In case of shock, these absorbent fixings are therefore deformed simultaneously with the shock-absorber and also contribute to absorbing the shock against the outer shell. Thus, this configuration allows elements protruding from the outer surface of the robot, such, for example, lines of the face of the robot, to deform, by deformation of the outer shell and buckling of the walls of the shock-absorber, without contributing to the propagation of the shockwave to the supporting column. The shock is absorbed and dissipated after this first deformation, by the absorbent fixings and by elastic deformation of the shock-absorber.

The cellular structure of the shock-absorber offers great design flexibility, and makes it possible to advantageously fit the shock-absorbing device into the structural and functional environment of the robot. For example, the head of the robot can comprise one or more light sources linked to the supporting column to represent the eyes of the robot. The shock-absorber of the front shock-absorbing device then comprises one or more emergent ducts, referenced 50 and 51 in FIG. 5a, making it possible to guide the light emitted by the light source or sources out of the head of the robot, for example through the orifices 14 and 15 represented in FIGS. 2a and 2b. The emergent ducts 50 and 51 are secured by one end to the supporting column and by a second end to the internal wall of the outer shell. They ensure a light guide function. Advantageously, they make it possible to both concentrate the light emitted by the light source and protect this source in case of shock.

The head of the robot can also comprise one or more sound sources 58 linked to the supporting column. According to the same principle, the shock-absorber of a shock-absorbing device then comprises one or more emergent ducts 52 making it possible to guide a sound wave emitted by the sound sources or sources out of the head of the robot. As previously, these emergent ducts 52 can be secured by one end to the supporting column and by a second end to the internal wall of the outer shell, making it possible to both guide a sound wave out of the head and protect the sound source in case of shock.

Fixing a microphone 53 to the internal wall of the outer shell of a shock-absorbing device is also envisaged by the present invention. The shell is linked to the supporting column by the shock-absorber and possibly by absorbent fixings, which are capable of absorbing shocks and vibrations. The fixing of the microphone to the deformable outer shell advantageously makes it possible to limit the noise resulting from vibrations, for example linked to the movements of the robot.

As represented in the figures, the cellular structure can also be configured to ensure a cooling of the head of the robot. To discharge the heat emitted by electronic components of the head of the robot, or more generally the heat emitted by an electronic module 54 fixed to the rigid structure of the shock-absorbing device, the cellular structure of the shock-absorber is configured to define a chimney 60 emerging at both ends in the main direction, making it possible to discharge heat emitted by the electronic module out of the robot. In other words, one of the cells of the cellular structure forms the chimney 60. In normal operation, the cellular structure makes it possible to discharge the heat. In case of shock, because of the buckling of the cellular structure, the transmission of the heat can be interrupted. This interruption remains momentary. In effect, the cellular structure, working in its elastic domain upon shocks, resumes its original form as soon as the shock is finished and also resumes its function of transmission of the heat through the chimney 60.

Figure 5B:
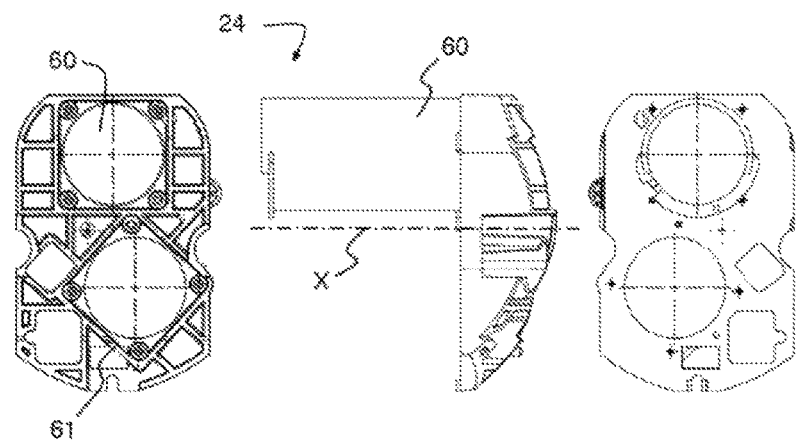

FIG. 5b shows a chimney 60 formed in the shock-absorber 24 of the rear shock-absorbing device 12. The shock-absorbing device can comprise a fan fixed to the shock-absorber making it possible to generate an airflow in proximity to the electronic module and through the chimney 60. To this end, the shock-absorber 24 comprises an imprint 61 configured to receive the fan and fixing means at four corners of the base of the fan. The fixing of the fan to the shock-absorber is also very advantageous because it makes it possible to dispense with the noises and vibrations linked to the rotation of the blades of the fan likely to be transmitted to the components fixed onto the supporting column.

In the example represented in the figures, the chimney and the fan are formed on the same shock-absorbing device, the rear shock-absorbing device. Forming the chimney and the fan on two distinct shock-absorbing devices is also envisaged.

The chimney 60 constitutes a cell of the set of emergent cells of the shock-absorber. The chimney has a length in the main direction much greater than those of the other cells. The chimney, of substantially cylindrical form, passes through a circular section of the supporting column. It is in contact by one of its ends in the main direction with the shock-absorber of the front shock-absorbing device, as represented in FIG. 4. The chimney, mounted through the supporting column, makes it possible to support the shock-absorber on the supporting column by gravity. This support by gravity complements the fixing of the shock-absorber onto the supporting column by bonding.

The shock-absorber of a shock-absorbing device is advantageously of a single piece. The shock-absorber can be produced by a molding method without mold slide. To this end, the shock-absorber advantageously comprises a seal plane substantially at right angles to the main direction; the cellular structure being configured in such a way that the cells close with distance away from the seal plane in the main direction. It should also be noted that, the shock-absorber consisting of a flexible and greatly deformable material, it is possible to deform the shock-absorber in the mold-stripping step. The presence of walls of small dimensions which oppose the mold-stripping in the main direction can therefore be tolerated.

In the example represented by the figures, the head comprises two shock-absorbing devices. In this preferred implementation of the invention, a humanoid robot is envisaged comprising a head and a body and the head of which comprises:
a supporting column 20 linked to the body of the robot,
a front shock-absorbing device 11 and a rear shock-absorbing device 12; each shock-absorbing device comprising a deformable outer shell, respectively 21 and 23, a shock-absorber, respectively 22 and 24, and a rigid structure secured to the supporting column 20.

The two shock-absorbing devices are placed facing one another in the main direction and on either side of the supporting column 20. The shock-absorbers of the two shock-absorbing devices 11 and 12 consist of a flexible cellular structure comprising a set of cells emerging in the main direction, and are secured to the supporting column 20 at a first end in the main direction, and linked to the deformable outer shell, respectively 21 and 23, at a second end opposite the first in the main direction. The outer shell 21 of the front shock-absorbing device 11 is also linked directly to the supporting column 20 by means of at least one absorbent fixing of silent block type.

The shock-absorber 24 of the rear shock-absorbing device 12 comprises a chimney 60 emerging at two ends in the main direction, making it possible to discharge heat emitted by an electronic module fixed to the supporting column 20 out of the head. The rear shock-absorbing device 12 also comprises a fan fixed onto the shock-absorber 24, and capable of generating an airflow in proximity to the electronic module and through the chimney 60 of the rear shock-absorbing device 12.

The shock-absorber 22 of the front shock-absorbing device 11 comprises two emergent ducts 50 and 51 making it possible to guide out of the head light emitted respectively by two light sources 56 and 57 fixed onto the supporting column 20. The shock-absorber 22 also comprises at least one emergent duct making it possible to guide a sound wave emitted by a sound source 58 fixed onto the supporting column 20. Finally, the front shock-absorbing device 11 also comprises at least one microphone fixed to an internal wall of the outer shell 21.

The invention relates generally to a shock-absorbing device. The shock-absorbing device is particularly suited to a mobile robot, such as a humanoid robot for example. The invention therefore relates also to a humanoid robot provided with a shock-absorber having the features described previously. A robot is envisaged in which the head comprises a first shock-absorbing device arranged in the front part of the head and a second shock-absorbing device arranged in the rear part of the head; the two shock-absorbing devices being placed facing one another in the direction the main direction and on either side of a rigid structure common to both shock-absorbing devices.

A robot of humanoid nature is also envisaged in which the torso comprises a first shock-absorbing device arranged in the front part of the humanoid robot, and a second shock-absorbing device arranged in the rear part of the robot; the two shock-absorbing devices being placed facing one another in the direction the main direction and on either side of a rigid structure common to both shock-absorbing devices.

The invention claimed is:

1. A shock-absorbing device for a mobile robot comprising:
a rigid structure linked to the mobile robot,
a deformable outer shell, and
a shock-absorber;
an electronic module fixed to the rigid structure,
the shock-absorber consisting of a flexible cellular structure comprising a set of cells emerging in a main direction, and being secured to the rigid structure at a first end in the main direction, and linked to the deformable outer shell at a second end opposite the first in the main direction, the shock-absorber comprising a chimney emerging at both ends in the main direction, making it possible to discharge heat emitted by the electronic module out of the mobile robot.

2. The device as claimed in claim 1, wherein the outer shell is also linked directly to the rigid structure by means of at least one absorbent fixing of silent block type.

3. The device as claimed in claim 1, wherein the shock-absorber comprises a seal plane substantially at right angles to the main direction; the cellular structure of the shock-absorber being configured in such a way that the cells close up with distance away from the seal plane in the main direction.

4. The device as claimed in claim 1, wherein the shock-absorber consists of a material chosen from the list comprising natural rubber, 4-polyisoprene, synthetic polyisoprene, polybutadiene, styrene-butadiene copolymer, polyisobutylene, isobutylene-isoprene, chloroprene, neoprene, butadiene-acrylonitrile copolymer, ethylene-propylene copolymer, terpolymer, polyether block amide, elastomer thermoplastics, thermoplastic polyurethanes, thermoplastic olefins, polysulfides, elastin protein, silicone elastomers, fluoroelastomers, perfluoroelastomers, ethylene-vinyl acetate copolymer, polyacrylic elastomers, ethylene-acrylic copolymer, chlorosulfonated polyethylene, epichlorohydrin elastomers.

5. The device as claimed in claim 1, comprising a fan fixed to the shock-absorber, and capable of generating an airflow in proximity to the electronic module and through the chimney.

6. The device as claimed in claim 1, comprising at least one light source linked to the rigid structure, and wherein the shock-absorber comprises an emergent duct configured to guide a light emitted by the light source out of the robot.

7. The device as claimed in claim 1, comprising at least one sound source linked to the rigid structure, and wherein the shock-absorber comprises an emergent duct configured to guide a sound wave emitted by the sound source out of the robot.

8. The device as claimed in claim 1, comprising at least one microphone fixed to an internal wall of the outer shell and wherein the shock-absorber allows phonic insulation.

9. A humanoid robot comprising a shock-absorbing device as claimed in claim 1.

10. A head of a humanoid robot comprising a shock-absorbing device as claimed in claim 1, and wherein the rigid structure is linked to a trunk of the robot.

11. The humanoid robot head as claimed in claim 10, comprising a first shock-absorbing device arranged in the front part of the head, and a second shock-absorbing device (12) arranged in the rear part of the head; the two shock-absorbing devices being placed facing one another in the direction the main direction and on either side of a rigid structure common to both shock-absorbing devices.

12. A torso of a humanoid robot as claimed in claim 9, comprising a first shock-absorbing device arranged in the front part of the humanoid robot, and a second shock-absorbing device arranged in the rear part of the robot; the two shock-absorbing devices being placed facing one another in the direction the main direction and on either side of a rigid structure common to both shock-absorbing devices.

* * * * *